No. 768,226. PATENTED AUG. 23, 1904.
W. E. HENION.
DEVICE FOR HEATING TIRES.
APPLICATION FILED APR. 20, 1904.
NO MODEL. 2 SHEETS—SHEET 1.

Attest:
M. B. Smith.
J. M. Deyo.

Inventor:
William E. Henion
By E. B. Whitmore, Atty.

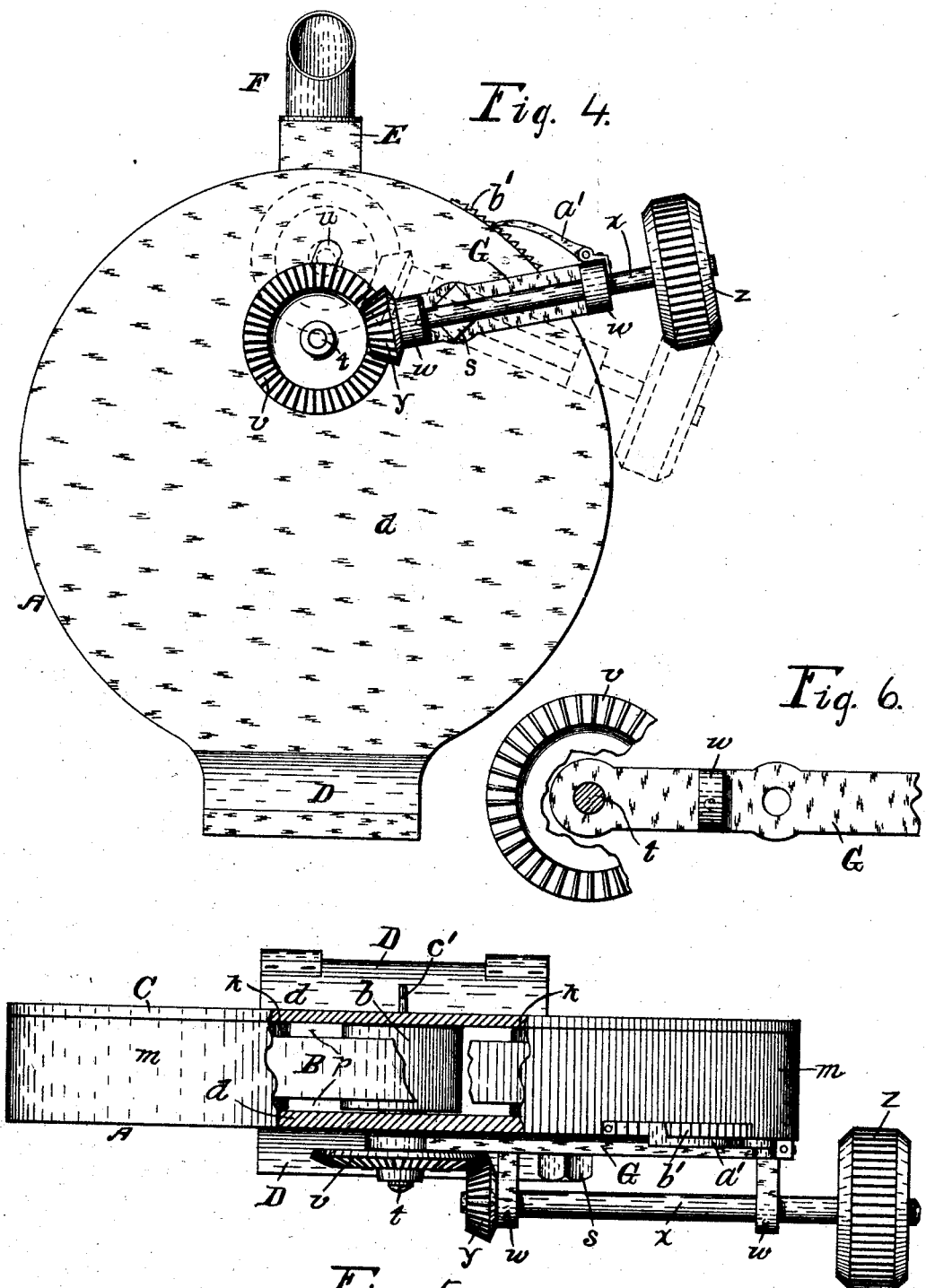

No. 768,226.

Patented August 23, 1904.

UNITED STATES PATENT OFFICE.

WILLIAM E. HENION, OF MARION, NEW YORK.

DEVICE FOR HEATING TIRES.

SPECIFICATION forming part of Letters Patent No. 768,226, dated August 23, 1904.

Application filed April 20, 1904. Serial No. 204,087. (No model.)

*To all whom it may concern:*

Be it known that I, WILLIAM E. HENION, of Marion, in the county of Wayne and State of New York, have invented a new and useful Improvement in Devices for Heating Tires, which improvement is fully set forth in the following specification and shown in the accompanying drawings.

My invention is a device for heating wagon-tires and similar metal rings, the same being hereinafter fully described, and more particularly pointed out in the appended claims.

It is necessary to heat wagon-tires for the purpose of setting them on old or new wheels and for other purposes, and for accurate and satisfactory work the tires or rings of iron need to be evenly and uniformly heated throughout their extent.

The object of my present invention is to produce a simple yet effective device for conveniently and quickly heating such wagon-tires and similar metal bands or rings uniformly throughout their whole extent for the various purposes stated.

This device I style a "portable tire-heater," the same being adapted to be used with and upon an ordinary blacksmith's forge, the fire of the forge serving to heat the tire or ring held within the hollow body of the device.

Other objects and advantages of the invention will be brought out and made to appear in the following specification, reference being had to the accompanying drawings, which drawings and the reference-letters marked thereon form a part of this specification.

Figure 1:
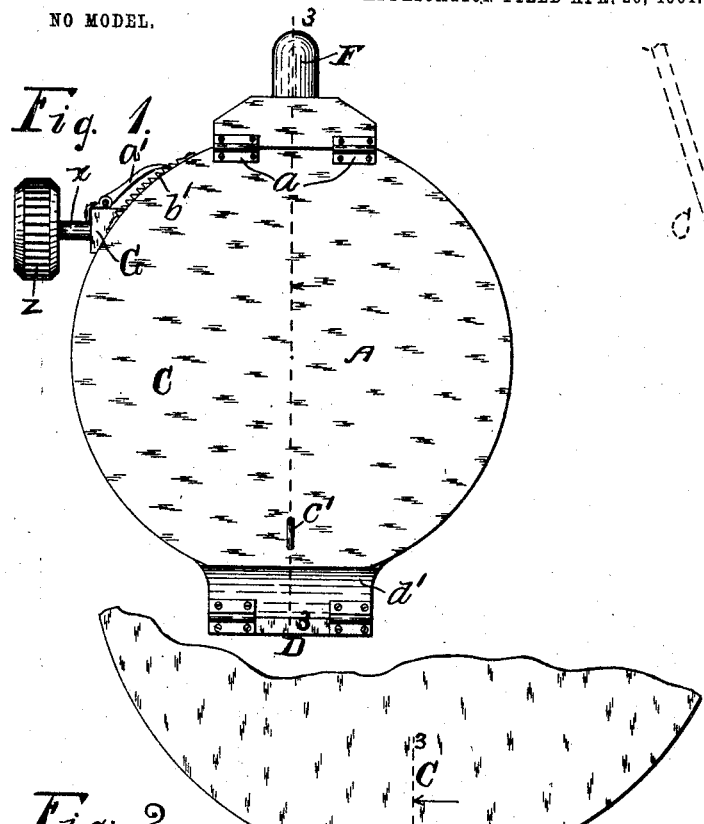
Figure 2:
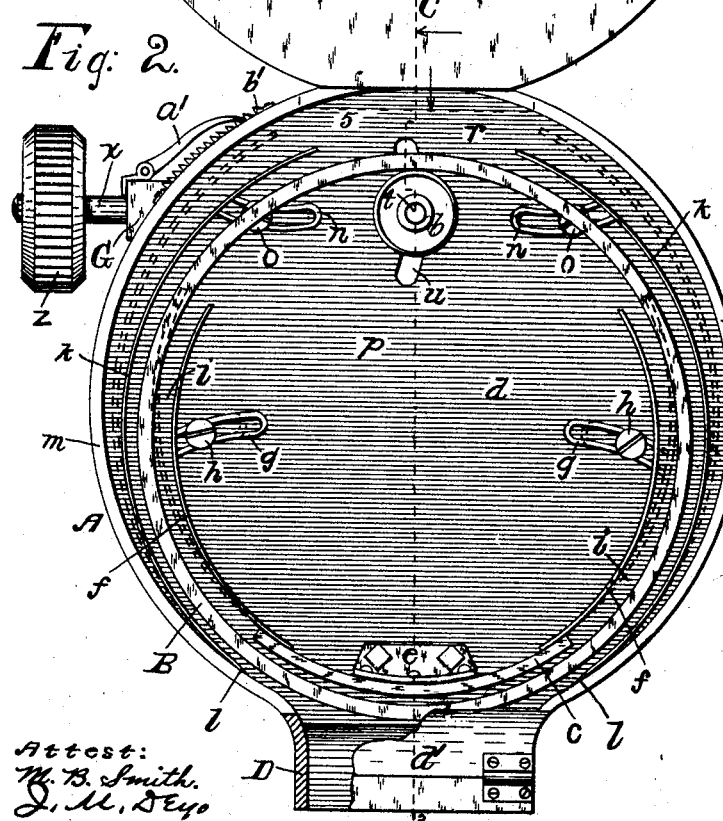
Figure 3:
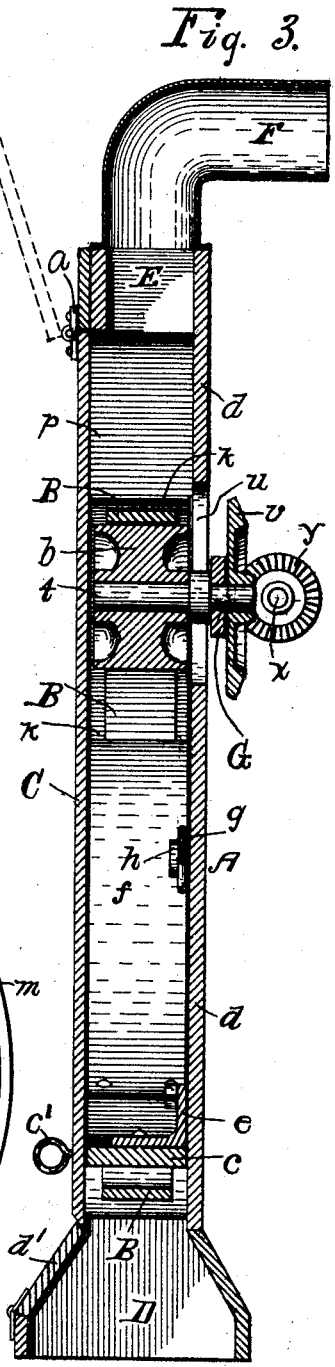

Figure 1 is a front elevation of the tire-heater as in use. Fig. 2 is a front view of the same with the swinging cover or lid thrown up to open the device, parts being shown in different positions by full and dotted lines and parts broken away. Fig. 3 is a vertical diametrical section of the device, taken on the dotted lines 3 3 in Figs. 1 and 2. Fig. 4 is a rear view of the device, showing the operating parts there attached, parts being shown in various positions by full and dotted lines. Fig. 5 is a plan of the device, parts being broken away and the section being on the horizontal dotted line 5 in Fig. 2. Fig. 6 is a rear elevation of the carrying-lever for the tire and associated gear, parts being broken away. Figs. 3, 5, and 6 are drawn to a scale larger and Fig. 1 to a scale smaller than that of Figs. 2 and 4.

In the drawings, A is the main part of the device, it being a circular hollow body adapted to be placed upright upon a blacksmith's forge over the fire and holding within it the tire B, Figs. 2, 3, and 5, to be heated.

C is a circular inclosing lid or cover for the space $p$ within the body, it being of sheet metal or other suitable material held by hinges $a$ to the body portion to swing in vertical directions thereon, as indicated in Figs. 2 and 3.

The body portion A is formed with an expanded part or fire-box D at its lower side or base to rest immediately over and cover the coal fire of the forge, the draft of the fire and the products of combustion passing upward in and through the space within the body, as a draft flue or chimney. Above the body A is commonly employed a short rectangular flue E, to the upper end of which is secured an ordinary sheet-metal pipe F of suitable bend or form to lead into a chimney.

The tire B is suspended on a carrying-roller $b$, Figs. 2, 3, and 5, made adjustable or shiftable in substantially vertical directions to hold tires of different diameters, the lower part of the tire in every case being low down and near the fire within the box D, as shown. A curved heat-deflecting plate $c$ is secured rigidly to the inner surface of the rear plate $d$ of the body A a short distance above the firebox D by a bracket $e$, Figs. 2 and 3, the lower part of the tire when in place being below said plate $c$, as appears in the figures. To the ends of the deflecting-plate $c$ are secured, respectively, flexible heat or current deflectors $f\,f$, these deflectors being thin strips of metal having loops $g\,g$, occupied by fasteners $h\,h$, threaded in the back plate $d$. By means of the loops and the threaded fasteners the upper ends of the deflectors $f\,f$ may be held in positions of adjustment, they being bent or turned in directions toward or from the tire, according to the size of the latter, to regulate the capacity of the inner flues or heat-spaces *i i* next the tire.

*k k*, Figs. 2, 3, and 5, are a pair of outer flexible heat-deflectors secured rigidly at points *l l* to the inner surface of the band or ring portion *m* of the body A and reach upward well toward the upper part of the inclosures *p* of said body, as shown in Fig. 2. These deflectors are provided with loops *n n* and threaded fasteners *o o*, similar to the parts *g g* and *h h*, above described, for holding them in positions of lateral adjustment, as indicated in Fig. 2. These deflectors *k k* are bent outward or inward, according to the diameter of the tire to be heated, all the flexible deflectors *f f* and *k k* being adjusted in each case to confine the currents of heat within narrow limits and near the tire being heated.

All of the deflectors, including the rigid plate *c*, have a common horizontal width about equal to the horizontal depth of the inclosure *p* of the body A, to the end that when the lid or cover C is closed and in place the ascending currents of heat will be confined closely along the tire on both sides and prevented from becoming diffused throughout the entire inclosed space *p* of the body A. It is found in practice not necessary to carry the inner deflectors *f f* as high as the outer ones *k k*, these being carried high up over the tire, as shown, leaving an opening *r* between their upper adjacent ends for the escape of the products of combustion.

The holding-roller *b* for the tire is conveniently carried at the end of a lever portion G, pivoted at *s* to the rear surface of the body A, so as to swing in a vertical plane. The roller *b* is held upon a spindle *t*, Fig. 3, having its overhanging end extending outward from the inclosure *p* of the body A through a curved slot *u* in the rear plate *d* of the body and piercing the end of the lever G, as shown. A bevel-gear *v* is made rigid with the spindle *t*, said gear, the spindle, and the roller turning as a single rigid body in the bearing in the lever G. The lever is formed with rearwardly-projecting bearings *w w*, holding a shaft *x*, provided at one end with a bevel-pinion *y* to engage the teeth of the gear *v* and at the other end with a suitable handle *z* for conveniently turning the shaft. The lever G is swung on its pivot *s* in vertical directions to raise or lower the carrying-roller *b* to properly hold the tire, in each case the lever being held or retained in its adjusted positions by some simple detent or fastener, as a pawl *a'*, held by the lever with its point engaging the teeth of a ratchet *b'*, secured to the body A. The weight of the loaded tire and other parts tend to carry the inner end of the lever downward; but this motion of the lever will be opposed by the pawl and the lever held thereby securely in positions of adjustment.

I do not confine myself to the pawl and ratchet shown. Any other simple and suitable detent or holder for the lever would as well answer the purpose.

I usually form the fire-box D with a door *d'* for the purpose of examining the fire within. The swinging cover C is raised and lowered by means of a rope or small cable attached to an eye-screw *c'*, the rope or cable extending upward over a pulley overhead.

What I claim as my invention, and desire to secure by Letters Patent, is—

1. A device for heating wagon-tires, consisting of a hollow body adapted to be placed over the fire of a forge, a revolving holder for the tire within the hollow body, a pivotal carrier for said holder to adapt it for tires of different sizes, and a fire-box at the base of said body, and means for turning the revolving holder.

2. A device for heating wagon-tires, consisting of a closed hollow body adapted to be placed over the fire of a forge, a revolving holder for the tire within the hollow body, a pivotal carrier for said holder to adapt it for tires of different sizes, and a series of heat-deflectors within the hollow body, a fire-box at the base of said hollow body and a closer for the hollow body joined in a flexible joint at the top thereof, and adapted to swing in an upward direction.

3. A device for heating metal rings, as wagon-tires, comprising a hollow body adapted to be placed over the fire of a blacksmith's forge, an adjustable holder for the tire within the hollow body, a fire-box for the body and a series of adjustable heat-deflectors within the body upon one side of the tire and flexible heat-deflectors upon the other side of the tire.

4. A portable device for heating tires, comprising a circular hollow body having a fire-box adapted to be placed over the fire of a forge, a rigid heat-deflector within the hollow body adjacent to and over the fire-box, and flexible heat-deflectors attached to the rigid deflector upon one side of the tire, and flexible heat-deflectors upon the other side of the tire, and means for holding and turning the tire.

5. A portable device for heating wagon-tires and similar metal rings, comprising a hollow body for receiving the tire, a revolving adjustable holder for the tire within the body, a spindle in the holder extending out of the hollow body, a gear on the spindle without the body, a pivoted lever outside said body, a carrier for the spindle, a shaft for said carrier movable in a curved slot in said body, and means on said carrier to turn the spindle.

6. A portable device for heating wagon-tires and similar metal rings, comprising a hollow body, an adjustable holder for the ring or tire within the body, a spindle projecting from the holder out of the hollow body, a gear on the spindle, a pivotal carrier for the spindle, a shaft on the carrier and pinion on the shaft for engaging said gear, and means for shifting the carrier and for holding the carrier in positions of adjustment.

In witness whereof I have hereunto set my hand, this 14th day of April, 1904, in the presence of two subscribing witnesses.

WILLIAM E. HENION.

Witnesses:
ENOS B. WHITMORE,
MINNIE SMITH.